United States Patent
Nguyen

(10) Patent No.: US 10,690,382 B2
(45) Date of Patent: Jun. 23, 2020

(54) HIGH-PRESSURE AND HIGH-TEMPERATURE CLOSED GEOTHERMAL EXCHANGER FOR A MAGMATIC OR METAMORPHIC FORMATION

(71) Applicant: BRGM, Orleans (FR)

(72) Inventor: Denis Nguyen, Montpellier (FR)

(73) Assignee: BRGM (FR)

( * ) Notice: Subject to any disclaimer, the term of this patent is extended or adjusted under 35 U.S.C. 154(b) by 29 days.

(21) Appl. No.: 15/778,951

(22) PCT Filed: Nov. 22, 2016

(86) PCT No.: PCT/FR2016/053045
§ 371 (c)(1),
(2) Date: May 24, 2018

(87) PCT Pub. No.: WO2017/089694
PCT Pub. Date: Jun. 1, 2017

(65) Prior Publication Data
US 2018/0340711 A1    Nov. 29, 2018

(30) Foreign Application Priority Data

Nov. 24, 2015   (FR) ...................... 15 61294

(51) Int. Cl.
*F24T 10/15*    (2018.01)
*F28F 21/06*    (2006.01)
*F24T 10/17*    (2018.01)
*F24T 10/13*    (2018.01)

(52) U.S. Cl.
CPC .............. *F24T 10/15* (2018.05); *F24T 10/13* (2018.05); *F24T 10/17* (2018.05); *F28F 21/062* (2013.01); *Y02E 10/125* (2013.01)

(58) Field of Classification Search
CPC . F24T 10/15; F24T 10/13; F24T 10/17; Y02E 10/125; F28D 7/12; F28F 21/062
USPC .......................................................... 165/45
See application file for complete search history.

(56) References Cited

U.S. PATENT DOCUMENTS

| | | | | |
|---|---|---|---|---|
| 3,461,952 | A * | 8/1969 | Decker | H01F 27/22 165/45 |
| 4,574,875 | A * | 3/1986 | Rawlings | F28D 20/0052 165/45 |
| 2009/0025902 | A1* | 1/2009 | Favier | F24T 10/15 165/45 |
| 2011/0036112 | A1 | 2/2011 | Livingston et al. | |
| 2012/0175077 | A1* | 7/2012 | Lehmann | E21B 7/00 165/45 |

(Continued)

FOREIGN PATENT DOCUMENTS

| | | |
|---|---|---|
| CH | 706507 A1 | 11/2013 |
| DE | 4329269 A1 | 4/1994 |

(Continued)

*Primary Examiner* — Tho V Duong
(74) *Attorney, Agent, or Firm* — St. Onge Steward Johnston & Reens, LLC

(57) ABSTRACT

The invention relates to a geothermal exchanger comprising a casing containing a heat-transfer fluid with which it is in direct contact. The casing is flexible such as to be in direct contact with a wall of the borehole containing the exchanger under the effect of the pressure of the heat-transfer fluid.

8 Claims, 1 Drawing Sheet

(56) References Cited

U.S. PATENT DOCUMENTS

2014/0026568 A1   1/2014  Peele
2015/0068740 A1*  3/2015  Broder ..................... E21B 3/00
                                                      166/254.1

FOREIGN PATENT DOCUMENTS

| | | | |
|---|---|---|---|
| FR | 2407434 A1 | 5/1979 | |
| FR | 2755662 A1 | 5/1998 | |
| FR | 2884905 A1 | 10/2006 | |
| FR | 3009613 A1 | 2/2015 | |
| JP | 2013108658 A * | 6/2013 | ............. F24T 10/17 |
| JP | 2015151837 A | 8/2015 | |
| WO | 2011036884 A2 | 3/2011 | |

\* cited by examiner

HIGH-PRESSURE AND HIGH-TEMPERATURE CLOSED GEOTHERMAL EXCHANGER FOR A MAGMATIC OR METAMORPHIC FORMATION

FIELD OF THE INVENTION

The present invention relates to the field of the diffusive geostorage of heat, namely storage with no exchange of matter with the subsoil, which involves closed geothermal exchangers through which there circulates a heat-transfer fluid that exchanges its heat with the sub-soil encasing the exchanger.

BACKGROUND OF THE INVENTION

What is meant by a closed geothermal exchanger is an exchanger that uses a heat-transfer fluid that circulates not in the surroundings but in sealed underground pipes. The heat-transfer fluid of these systems therefore does not form part of the geological surroundings. As a matter of principle, the heat-transfer fluid that circulates in a closed system is always the same and represents a limited volume. In the case of a closed geothermal exchanger, there is no exchange of matter between the exchanger and the environmental surroundings.

The only geostorage operations performed at the present time are the diffusive geostorage of heat using pressurized water as the heat-transfer fluid (Borehole Thermal Energy Storages—BTES). These geothermal exchangers are made up of coaxial U-shaped tubes, or tubes having another geometry, typically made of high density polyethylene (PEHD) or any other rigid material.

The boreholes in the subsoil in which these tubes are placed are plugged with a hydrated cement the purpose of which is to provide thermal coupling between the wall of the rigid tube that constitutes the exchanger and the wall of the borehole.

Existing closed geothermal exchangers are ill suited to operating temperatures in excess of 100° C. because of the thermal coupling with the encasing rocky massif which is performed by way of a hydrated cement which would experience impediment of its geomechanical properties above and beyond 100° C.

This is why, at the present time, the temperatures of the heat-transfer fluid in operations involving the diffusive geostorage of heat using pressurized water as the heat-transfer fluid in the closed geothermal exchangers are generally comprised between 50° C. and 70° C. The pressure in the exchangers is of the order of ten bar or so.

However, there is a need for closed geothermal exchangers in which the heat-transfer fluid can be at a temperature higher than 100° C.

Thus, for example, for the in-massif storage of electricity by thermal pair as described in document FR 3009613, the "hot" pole of the thermal pair is a heat geostore using closed geothermal exchangers. The heat-transfer fluid in the geothermal exchangers is carbon dioxide ($CO_2$) in a supercritical state, at a temperature that can be as high as 140° C., and at a pressure that can be as high as 120 bar.

The heat-transfer fluid could also be superheated steam. The temperature in the exchanger could then, for example, reach 240° C.

SUMMARY OF THE INVENTION

The object of the invention is to provide a closed geothermal exchanger the operation of the heat-transfer fluid of which can be at a temperature higher than 100° C.

To that end, the subject of the invention is a closed geothermal exchanger for a magmatic or metamorphic formation, comprising a shell containing a heat-transfer fluid with which it is directly in contact. The exchanger is characterized in that the shell is flexible so that it can be in direct contact, under the effect of the pressure of the heat-transfer fluid, with a wall of a borehole containing the exchanger.

What is meant by a "flexible shell" is a shell that has a shore A hardness comprised between 60 and 90.

What is meant by a "magmatic formation" is a formation resulting from the crystallization of a magma.

What is meant by a "metamorphic formation" is a formation that has undergone a transformation in the solid state as a result of an increase in temperature and/or pressure, notably with the crystallization of new minerals.

The exchanger has the geomechanical strength properties necessary for being placed in direct contact with the magmatic or metamorphic formation.

When pressurized by the heat-transfer fluid, the wall of the shell, or bladder, is pressed firmly into contact with the rocky massif, thus providing thermal coupling between the exchanger and the encasing rocky massif, without requiring thermal coupling material between the geothermal exchanger and the rocky massif. The device is thus simplified in comparison with devices that have coupling material.

The borehole in which the geothermal exchanger is placed is a vertical borehole.

The magmatic rock or the metamorphic rock in which the borehole is made is a healthy rocky outcrop, at zero meters. It is not an altered formation. There is no soil on the top. If there is a layer of plant matter, this is stripped off before the borehole is made.

The injection and return of the heat-transfer fluid are performed at the same end of the geothermal exchanger, at its upper end at the surface.

This end is said to be at the surface because it is oriented toward the ground, as opposed to the other end which is oriented toward the depth.

Advantageously, the upper part of the exchanger comprises a containment device designed to limit the expansion of the flexible shell.

The containment device is able to withstand the internal pressure in the exchanger applied to the upper part of the bladder.

In one embodiment, the containment device is made up of a containment harness which, at least in part, caps the upper part of the exchanger.

As a preference, the containment device extends over a length from 1 m to 3 m from the upper end of the exchanger.

That part of the containment device that is situated below ground level is held in place by being squashed between the exchanger bladder pressurized by the heat-transfer fluid, and the wall of the borehole.

Optionally, the containment harness is made from aramid straps, such as Kevlar straps.

Advantageously, the geothermal exchanger extends over a length from 10 to 30 m.

According to one embodiment, it may extend over a length from 12 to 30 m. According to another embodiment, it may extend over a length from 10 to 20 m.

Its diameter is from 20 to 50 cm, preferably from 20 to 30 cm.

The thickness of the wall of the bladder is from 10 mm to 50 mm, preferably from 10 to 30 mm.

Advantageously, the flexible shell is made of silicone elastomer.

That material has all the thermomechanical strength qualities required to operate at high temperatures (up to at least 250° C.) and high pressures (up to at least 150 bar), and has a high coefficient of elasticity allowing the wall of the bladder of the geothermal exchanger to conform as closely as possible to the wall of the encasing rocky massif once the bladder has been pressurized by the heat-transfer fluid in the exchanger. A geothermal exchanger such as this can therefore be used in the case of projects for the diffusive geostorage of heat at temperatures higher than 100° C., whether using superheated steam or $CO_2$ in a supercritical state.

In this embodiment, a silicone elastomer having an increased thermal conductivity, notably higher than 3.5 W/(m·K), is chosen so that it is similar to the thermal conductivity of granite.

Optionally, the geothermal exchanger also comprises an inner tube into which the heat-transfer fluid is injected. The inner tube is provided in its bottom part with an opening that allows the fluid to pass toward the outside of the inner tube.

Such a device allows the exchanger to be adapted to suit boreholes which may reach depths of 30 m.

For preference, the inner tube has an inside diameter of 120 to 200 mm depending on the diameter of the geothermal exchanger. Advantageously, the inside diameter of the inner tube is 120 mm for an exchanger diameter of 20 cm, and 200 mm for an exchanger diameter of 30 cm.

In general, the diameter of the inner tube is determined so that the loss of pressure head in the flow between entering the exchanger and exiting the exchanger (namely the sum of the losses in pressure head in the inner tube and in the annular space) is minimal.

Advantageously, the inner tube is made from a flexible material such as silicone elastomer. For the manufacture of the inner tube, a silicone elastomer with a low thermal conductivity, notably of between 0.15 and 0.25 W/(m·K) is chosen, so as to limit heat losses internal to the geothermal exchanger.

BRIEF DESCRIPTION OF THE DRAWINGS

The invention will be better understood from studying the attached figures, which are provided by way of entirely nonlimiting example, in which.

DETAILED DESCRIPTION OF THE INVENTION

Figure 1:
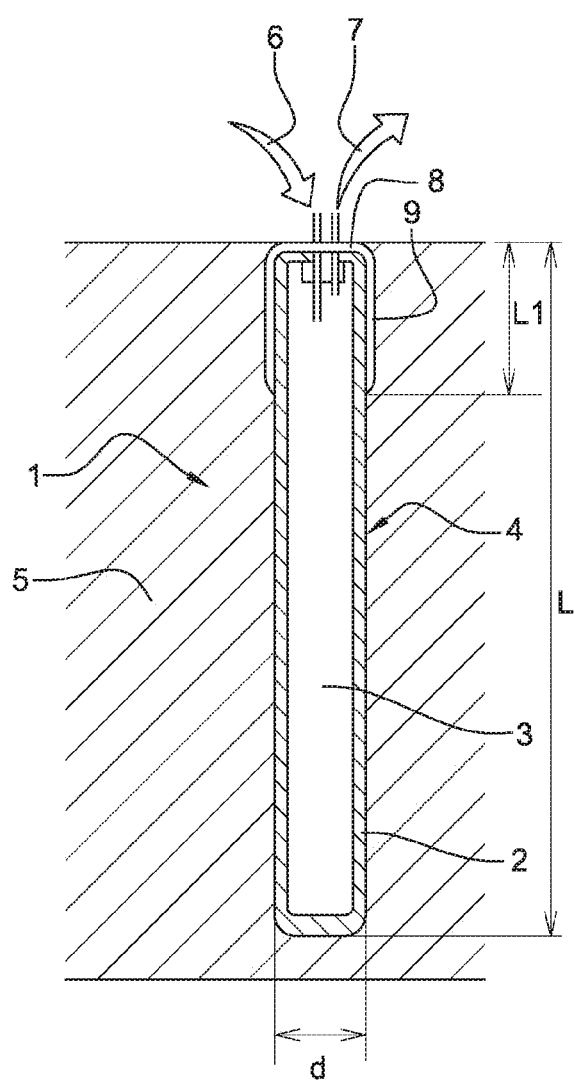
FIG. 1 is a view in longitudinal section of a closed geothermal exchanger according to one embodiment of the invention.

Reference is now made to FIG. 1 which shows a closed geothermal exchanger 1 according to one embodiment of the invention. The geothermal exchanger comprises a shell 2 containing $CO_2$ in a supercritical state 3 (supercritical $CO_2$) used as a heat-transfer fluid. The shell 2 and the heat-transfer fluid 3 are in direct contact.

The shell 2 is made of a silicone elastomer which is a flexible material the shore A hardness of which is comprised between 60 and 90. However, it could be made from any other material that gives it the flexibility it needs to come into direct contact, under the effect of the heat-transfer fluid, with the wall of the borehole.

The silicone elastomer used to make the shell 2 has a thermal conductivity higher than 3.5 W/(m·K). This value is similar to the thermal conductivity of granite.

The heat-transfer fluid may be any heat-transfer fluid chemically compatible with silicone elastomer, which may have a temperature ranging as high as at least 250° C. and a pressure of up to at least 150 bar.

The geothermal exchanger 1 is installed in a vertical borehole 4 made in a granite formation 5. Under the effect of the pressure of the supercritical $CO_2$ fluid 3, the shell 2 is brought into direct contact with the wall of the borehole 4. The injection 6 and return 7 of the heat-transfer fluid 3 are performed at the surface end 8 of the upper part of the shell 2.

The upper part of the exchanger 1 is contained within a containment harness 9 made of Kevlar straps. It may be made of other aramid straps. The straps used have a width of 1 cm and their cumulative width is 40 cm. The straps could have a different width. The containment harness constitutes a containment device the shape of which could be other than that of a harness.

The containment harness 9 extends over the upper part of the shell, including its surface end 8. It extends over a length L1 of 1 m and is wedged between the bladder 2 and the granite formation 5.

The shell 2 extends over a length L2 of 20 m. This length may be different. It may vary from 10 to 20 m. Its diameter d is 20 cm. It may be different and vary from 20 to 30 cm. The thickness of its wall is 10 mm. It may be different and vary from 10 to 30 mm.

For an internal pressure of 120 bar in the shell 2, the load on the upper part of the exchanger 20 cm in diameter in contact with atmospheric pressure is 38 000 daN. The Kevlar straps used have a tensile strength of 1000 daN per cm of width. A cumulative width of around 40 cm of straps distributed over the 62 cm of circumference of the bladder 2 makes it possible to compensate for the load on the upper part of the exchanger. As it is pressurized, when the bladder 2 is not yet pressed firmly against the wall of the hole, the resistance of the bladder 2 to stretching is enough to keep the bladder 2 and the heat-transfer fluid 3 inside the borehole 4. When the bladder 2 is pressed against the wall of the borehole 4 by 120 bar of internal pressure, the bladder 2 is held in place by the resistance of the walls of the borehole and by the resistance of the containment harness 9. As the length of strap wedged between the bladder 2 and the granite formation 5 is 1 m, the area of straps subjected to the pressure of 120 bar is 100 $cm^2$, which corresponds to a crushing force on the strap of 12 000 daN, which means that a tensile force of 1000 daN on the strap can be withstood.

Figure 2:
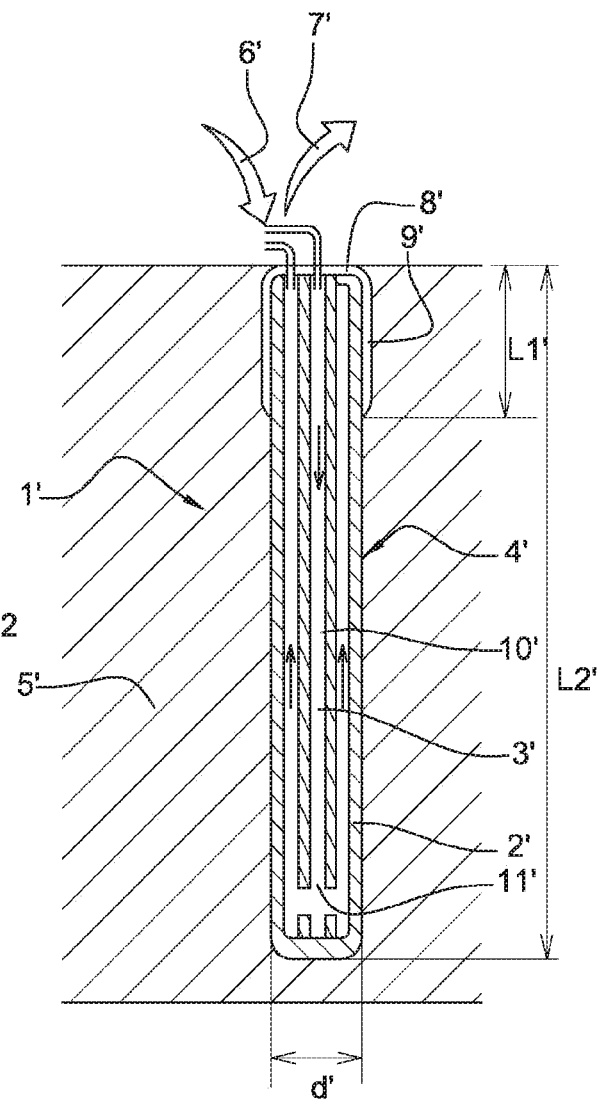
FIG. 2 is a view in longitudinal section of a closed geothermal exchanger according to a second embodiment of the invention.

FIG. 2 shows a closed geothermal exchanger 1' according to another embodiment of the invention. The exchanger 1' comprises a shell 2' containing supercritical $CO_2$ fluid 3'. The shell 2' and the heat-transfer fluid 3' are in direct contact.

The shell 2' is made of silicone elastomer with a shore A hardness comprised between 60 and 90. It could, however, be made from any other material that gives it the flexibility that allows it to come into direct contact, under the effect of the heat-transfer fluid, with the wall of the borehole.

The silicone elastomer used to make the shell 2' has increased thermal conductivity, higher than 3.5 W/(m·K).

The heat-transfer fluid may be any heat-transfer fluid chemically compatible with silicone elastomer, which may have a temperature ranging as high as at least 250° C. and a pressure of up to at least 150 bar.

The exchanger 1' is installed in a vertical borehole 4' made in a granite formation 5'. Under the effect of the pressure of the supercritical $CO_2$ fluid 3', the shell 2 is brought into direct contact with the wall of the borehole 4'. The injection 6' and return 7' of the heat-transfer fluid 3' are performed at the surface end 8' of the upper part of the shell 2'.

The upper part of the exchanger 1' is contained in a containment harness 9' made of Kevlar straps. It may be manufactured from other aramid straps. The containment harness constitutes a containment device the shape of which could differ from that of a harness. The straps used have a width of 1 cm and their cumulative width is 40 cm. The straps could have a different width. The containment harness constitutes a containment device the shape of which could differ from that of a harness.

The containment harness 9' extends over the upper part of the shell, including its surface end 8'. It extends over a length L1' of 1 m and is wedged between the bladder 2 and the granite formation 5.

The exchanger 1' also comprises an inner tube 10' made of silicone elastomer. This inner tube 10' has an opening 11' allowing fluid to pass between the inside of the tube 10' and the outside of the tube 10'.

The circulation of heat-transfer fluid 3' in the shell 2' is thus organized from the inside of the tube 10' toward the outside of the tube 10', as indicated by the three arrows in the shell 2'. The direction of circulation in the shell 2' may be organized in the opposite direction.

The silicone elastomer of which the inner tube 10' is made has a low thermal conductivity so as to limit internal thermal heat losses. The value of its thermal conductivity is of the order of 0.2 W/(m·K).

The shell 2' extends over a length L2' of 30 m. This length may be different. It may vary from 12 to 30 m. Its diameter is 20 cm. It may be different and vary from 20 to 30 cm. The inside diameter of the inner tube 10' is 120 mm. The diameter of the inner tube may vary according to the diameter d' of the geothermal exchanger 1'. It may be 200 mm when the diameter d' of the geothermal exchanger is 30 cm. The thickness of its wall is 10 mm. It may differ and vary from 10 to 30 mm.

For an internal pressure of 120 bar in the shell 2', the load on the upper part of the exchanger 20 cm in diameter in contact with atmospheric pressure is 38 000 daN. The Kevlar straps used have a tensile strength of 1000 daN per cm of width. A cumulative width of around 40 cm of straps distributed over the 62 cm of circumference of the bladder 2 makes it possible to compensate for the load on the upper part of the exchanger. As it is being pressurized, when the bladder 2' is not yet pressed firmly against the wall of the hole, the resistance of the bladder 2' to stretching is enough to hold the bladder 2' and the heat-transfer fluid 3' in the borehole 4'. When the bladder 2' is pressed against the wall of the borehole 4' by 120 bar of internal pressure, the bladder 2' is held in place by the resistance of the walls of the borehole and by the resistance of the containment harness 9'. As the length of strap wedged between the bladder 2' and the granite formation 5' is 1 m, the surface area of strap subjected to the pressure of 120 bar is 100 $cm^2$, which corresponds to a crushing force on the strap of 12 000 daN, which means that a tension of 1000 daN on the strap can be withstood.

The invention is not restricted to the embodiments set out and other embodiments will be clearly apparent to those skilled in the art.

The invention claimed is:

1. A closed geothermal exchanger for a magmatic or metamorphic formation, comprising
    a shell containing a heat-transfer fluid with which it is directly in contact, the shell having a surface end and a borehole end, and
    a containment device that, at least in part, caps and extends over an upper part of the shell including the shell surface end, the containment device including a harness comprising aramid straps,
    wherein the shell is flexible so that it can be in direct contact, under the effect of the pressure of the heat-transfer fluid with a wall of a borehole containing the exchanger.

2. The geothermal exchanger as claimed in claim 1, the flexible shell having a shore A hardness of between about 60 and about 90.

3. The geothermal exchanger as claimed in claim 1, the flexible shell comprising silicone elastomer.

4. The geothermal exchanger as claimed in claim 3, the silicone elastomer having a thermal conductivity higher than 3.5 W/(m·K).

5. The geothermal exchanger as claimed in claim 1, further comprising an inner tube into which the heat-transfer fluid is injected, the inner tube comprising a bottom part with an opening that allows the heat-transfer fluid to pass toward the outside of the inner tube.

6. The geothermal exchanger as claimed in claim 5, the inner tube comprising a silicone elastomer having a thermal conductivity of about 0.2 W/(m·K).

7. The geothermal exchanger as claimed in claim 1, the temperature of the heat-transfer fluid being greater than 100° C.

8. The geothermal exchanger as claimed in claim 1, wherein the aramid straps are comprised of poly-paraphenylene terephthalamide.

* * * * *